Patented Mar. 27, 1945

2,372,367

UNITED STATES PATENT OFFICE 2,372,367

PURIFICATION OF ZINC OXIDE

Harlan A. Depew, Haddonfield, N. J., assignor to American Zinc, Lead & Smelting Company, St. Louis, Mo., a corporation of Maine No Drawing. Application May 28, 1941,
Serial No. 395,672

5 Claims. (Cl. 23—147)

This invention pertains to the refining and purifying of zinc oxides and particularly to the purifying of American Process zinc oxides containing a high percentage of sulfur which is so combined with the zinc oxides as to make them undesirable for use in rubber.

American Process zinc oxides are made from ore containing sulfur and are acidic. Their acidity is determined by titrating a water suspension of the oxide using phenolphthalein as an indicator, although the pH in water suspension may actually test about 7, in other words, indicate that it is neutral.

If such a zinc oxide is washed in water only a part of the sulfur content is dissolved and may be removed. It has long been known that if water containing small amounts of an alkali in solution is added to the zinc sulfur compounds these compounds react with the alkali to form water soluble material and the greater part of the sulfur may be removed. For example, it has been common practice to wash zinc oxides with dilute solutions of sodium carbonate. This process is disclosed in Patent No. 502,822, issued in 1893.

There are two serious objections to using fixed alkalis of the nature of sodium carbonate for removing sulfur compounds from zinc oxide. First, it is practically impossible to wash out or otherwise remove all of the sodium carbonate from the zinc oxide. This tends to produce a zinc oxide of much higher alkalinity than is desirable. To illustrate this point water slurries of several different types of zinc oxides were prepared under similar conditions and the results were as follows:

American Process zinc oxide_____ pH 6.95
French Process zinc oxide_____ pH 7.37
Sodium carbonate washed zinc oxide____ pH 8.31

It will be noted that the zinc oxide which was washed with the sodium carbonate solution shows a pH of 8.31. Such a pH is undesirable as the high alkalinity of the zinc oxide may cause scorching when it is utilized in rubber compounds.

The second objection to the use of a fixed alkali solution for washing zinc oxide lies in the fact that a small amount of alkali salt is left in the oxide, thereby making it unfit for use in those rubber compounds which are to be used for electrical insulation.

This invention pertains to a new and improved process for substantially completely removing the sulfur content of American Process zinc oxide which obviates the defects inherent in the alkali solution process. I have discovered that when the zinc oxide is treated in aqueous dispersion with ammonia, as by adding ammonia or alkaline compounds of ammonia, for example, ammonium carbonate or ammonium hydroxide, the ammonia will remove the sulfur compounds more completely and more rapidly than an equivalent amount of fixed alkali in the process mentioned above. Also, a more effective purification results at a much lower cost. Further, it has been determined that any excess of ammonia or residual ammonium salts will be volatilized during the subsequent drying processes to the end that the final product will be completely free from water soluble salts and will have an alkalinity when tested with phenolphthalein similar to that of French Process zinc oxides. Comparative tests show that an American Process zinc oxide washed with ammonia tested pH 7.66, while a similar zinc oxide washed with sodium carbonate tested pH 8.31.

In my opinion the alkaline compounds of ammonia are superior to the fixed alkalis for purifying zinc oxide because the ammonia tends to form a Wernerian compound such as $$(NH_3)_4ZnSO_4$$

with the zinc sulfate content of the zinc oxide. This Wernerian compound is extremely soluble, is easily dissolved in the washing solution, and is practically completely removed when the water is filtered off.

I have determined that in treating American Process zinc oxide by my method a quantity of ammonia not less than four times the amount theoretically necessary to combine with the sulfur compounds should be used for essentially complete removal of said sulfur compounds. Moreover, the slurry preferably should be agitated for at least three hours to insure the completion of the reaction.

As an example of the present process American Process zinc oxide was treated in two-ton lots until sixty tons had been prepared. A brick lined tank eight feet in diameter and ten feet high was used for the reaction tank. It was equipped with a propeller type agitator on a horizontal shaft near the bottom of the tank and driven by a 10 H. P. motor. Two tons of zinc oxide were agitated violently for three hours with four tons of water containing 40 to 50 lbs. of $NH_3$. An additional four tons of water were added and stirred a few minutes. The resultant slurry was filtered on two 6 leaf Moore type filters and washed with an additional twelve and one-half tons of water. The cake on the filter was vacuum dried to 35–40% moisture and then was further dried to 3-6% moisture in a vertical steam heated grid dryer. It was finally dried to .05% moisture in a rotary gas fired dryer at 180-250° C. The product was then milled in a hammer type mill using a .027 inch herringbone screen. The washed and disintegrated zinc oxide was passed through a 46 mesh screen and then packaged.

The following are examples of the product from three of the two ton lots:

| Material | Per cent S before processing | Pounds $NH_3$ per ton ZnO | Per cent S after processing |
| --- | --- | --- | --- |
| Zinc oxide A | 0.210 | 25.0 | 0.0050 |
| Zinc oxide B | 0.095 | 20.0 | 0.0095 |
| Zinc oxide C | 0.055 | 19.5 | 0.0060 |

In the commercial plant the flow of material is continuous when the present process is followed. The zinc oxide from the bag room or from the reheating furnaces is fed into one of two reaction tanks. When the reaction is complete the slurry is fed to a rotary filter or centrifugal where the zinc oxide is dewatered and washed. The dewatered cake is then fed to a rotary tube drier with some recirculation of dry material to prevent sticking. The dried zinc oxide is then conventionally milled, screened and packed.

The present invention is susceptible of numerous modifications without departing from the spirit thereof, attention is directed to the appended claims for limiting its scope.

What is claimed is:

1. The method of substantially reducing the content of water-soluble acidic compounds in zinc oxide containing the same which comprises treating the zinc oxide in thorough aqueous dispersion with ammonium hydroxide, separating the so-treated zinc oxide in a wet condition from the residual aqueous liquor and drying and disintegrating the separated zinc oxide to produce a zinc oxide product containing substantially less water-soluble acidic compounds than the original zinc oxide.

2. A process for removing water-soluble acidic compounds from zinc oxide containing the same which comprises treating the zinc oxide in a water slurry with ammonia, separating the so-treated zinc oxide in a wet condition from the residual aqueous liquor, and drying the separated zinc oxide.

3. A process for removing water-soluble acidic compounds from zinc oxide containing the same which comprises treating the zinc oxide in a water slurry with ammonium carbonate, separating the so-treated zinc oxide in a wet condition from the residual aqueous liquor, and drying the separated zinc oxide.

4. A process for removing water-soluble acidic compounds from zinc oxide containing the same which comprises dispersing the zinc oxide in water and treating the dispersed oxide with ammonium hydroxide, separating the so-treated zinc oxide in a wet condition from the residual aqueous liquor, and drying the separated zinc oxide.

5. A process for removing water-soluble acidic compounds from zinc oxide containing the same which comprises treating the zinc oxide in a water slurry with ammonia, filtering the so-treated zinc oxide from the residual aqueous liquor, washing the filtered zinc oxide, and then drying the zinc oxide.

HARLAN A. DEPEW.